(12) United States Patent
Hutek et al.

(10) Patent No.: US 7,168,750 B2
(45) Date of Patent: Jan. 30, 2007

(54) RISING HINGE SYSTEM FOR COMPARTMENT LID

(75) Inventors: James M. Hutek, St. Clair Shores, MI (US); James A. Mulvihill, Berkley, MI (US); Alan Sturt, W. Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 107 days.

(21) Appl. No.: 10/907,542

(22) Filed: Apr. 5, 2005

(65) Prior Publication Data

US 2006/0220408 A1 Oct. 5, 2006

(51) Int. Cl.
*B60N 3/12* (2006.01)

(52) U.S. Cl. .................... 296/37.8; 296/24.34
(58) Field of Classification Search ............... 296/37.8, 296/24.34
See application file for complete search history.

(56) References Cited

U.S. PATENT DOCUMENTS

| | | | | |
|---|---|---|---|---|
| 2,797,739 A * | 7/1957 | Orsini | | 297/188.17 |
| 4,087,126 A * | 5/1978 | Wynn | | 296/37.8 |
| 5,076,641 A * | 12/1991 | Lindberg | | 297/188.19 |
| 5,390,976 A * | 2/1995 | Doughty et al. | | 297/115 |
| 5,558,385 A * | 9/1996 | Gross et al. | | 296/37.12 |
| 5,800,005 A * | 9/1998 | Arold et al. | | 296/37.12 |
| 5,845,965 A * | 12/1998 | Heath et al. | | 297/188.19 |
| 5,887,930 A * | 3/1999 | Klein | | 296/37.9 |
| 5,893,478 A * | 4/1999 | Maruoka | | 296/24.34 |
| 6,003,927 A * | 12/1999 | Korber et al. | | 296/37.8 |
| 6,045,173 A * | 4/2000 | Tiesler et al. | | 296/37.8 |
| 6,203,088 B1 * | 3/2001 | Fernandez et al. | | 296/37.8 |
| 6,419,314 B1 * | 7/2002 | Scheerhorn | | 296/37.8 |
| 6,435,587 B1 * | 8/2002 | Flowerday et al. | | 396/37.8 |
| 6,572,168 B1 * | 6/2003 | Radstake | | 296/37.6 |
| 6,616,206 B2 * | 9/2003 | Luginbill et al. | | 296/37.8 |
| 6,719,343 B2 * | 4/2004 | Emerling et al. | | 296/24.34 |
| 6,845,895 B2 | 1/2005 | Jones et al. | | |
| 6,883,680 B2 | 4/2005 | Hirose | | |
| 6,890,012 B2 * | 5/2005 | Maierholzner | | 296/24.34 |
| 7,029,048 B1 * | 4/2006 | Hicks et al. | | 296/24.34 |
| 7,029,049 B2 * | 4/2006 | Rockafellow et al. | | 296/37.8 |

\* cited by examiner

*Primary Examiner*—Kiran B. Patel
(74) *Attorney, Agent, or Firm*—Earl LaFontaine, Esq.; Artz & Artz, P.C.

(57) ABSTRACT

A vehicle storage compartment system for a central console includes a lid and at least one hinge mechanism rotatable coupled to the lid and moveably coupled to the storage compartment. Each of the set of hinge blades define limit stop openings and receive limit stoppers therethrough, thereby limiting vertical movement of the set of hinge blades. The system also includes a set of tracks, and each of the tracks receives one of the set of hinge blades, such that the set of hinge blades move upwardly and downwardly as a function of opening and closing the lid. This movement allows the lid to flip open 180° and lie flushly against an adjacent object.

11 Claims, 4 Drawing Sheets

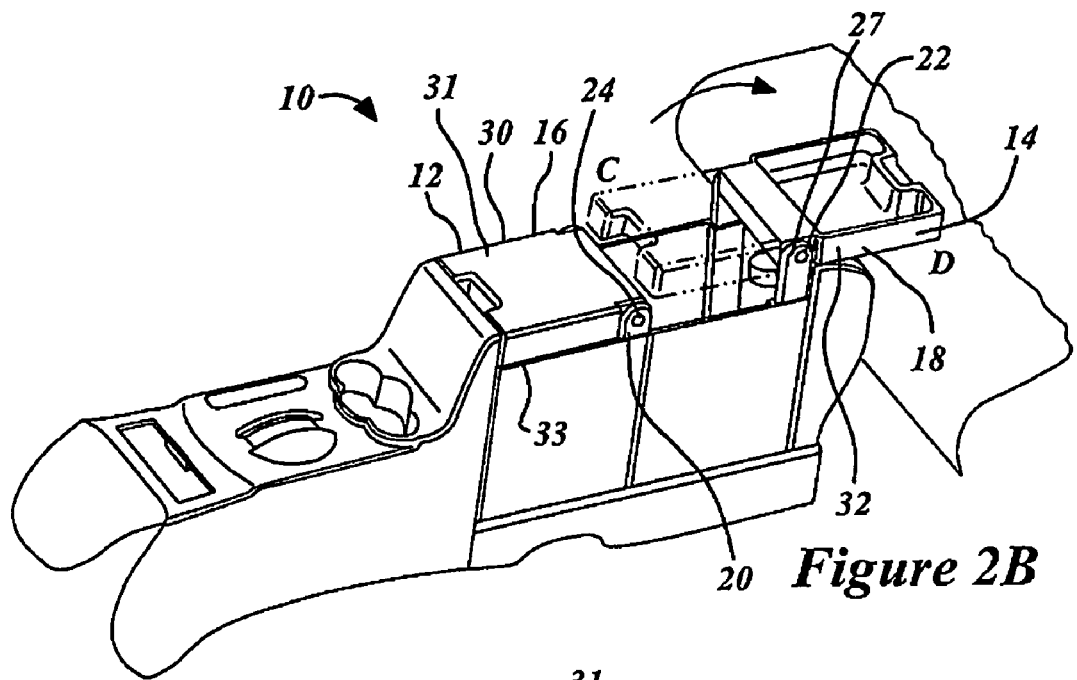
Figure 2B
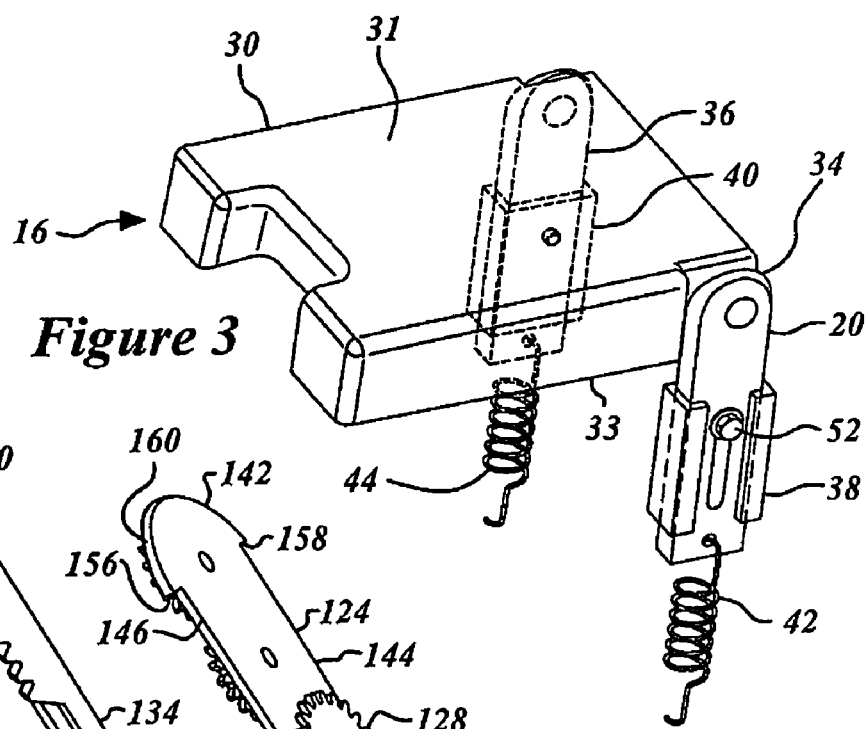
Figure 3
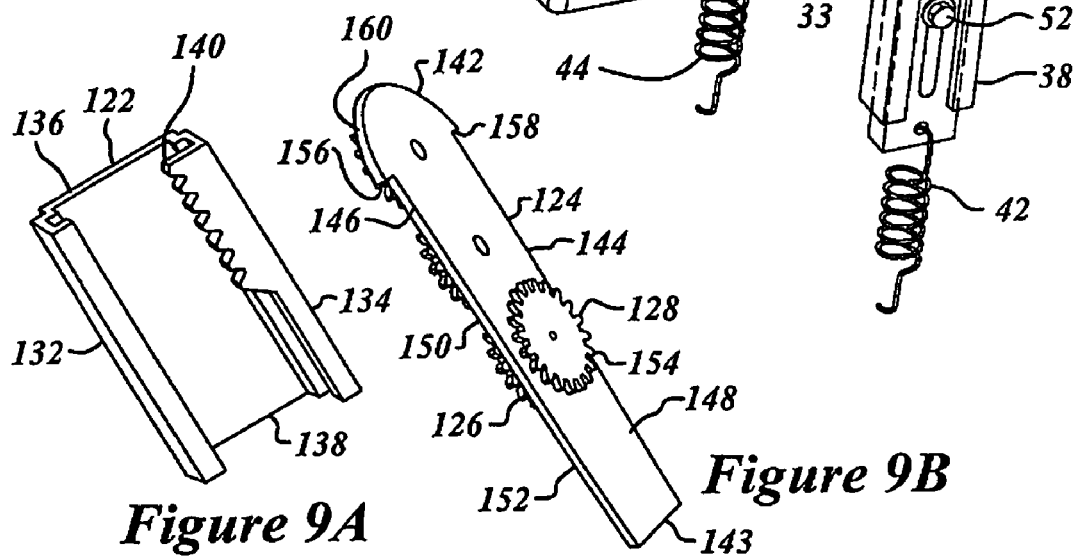
Figure 9A  Figure 9B

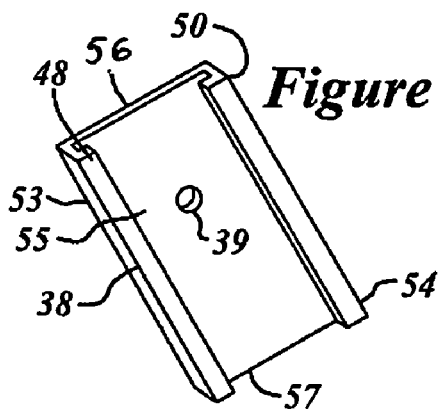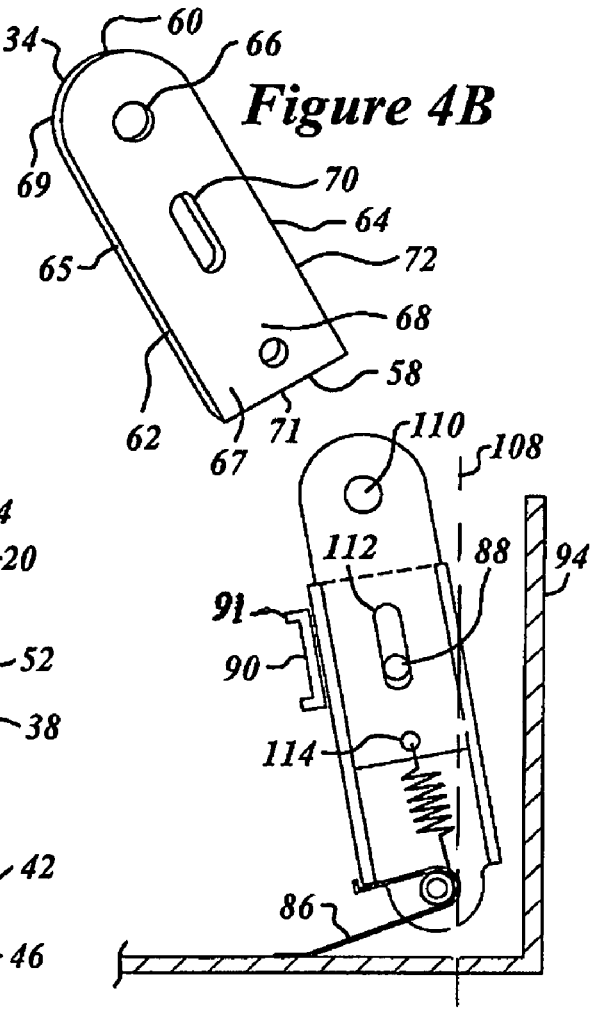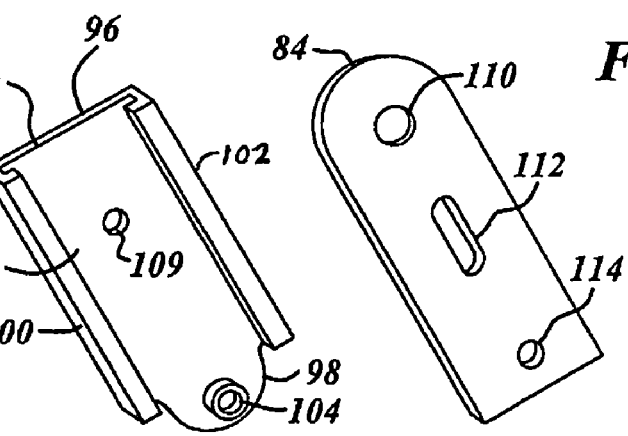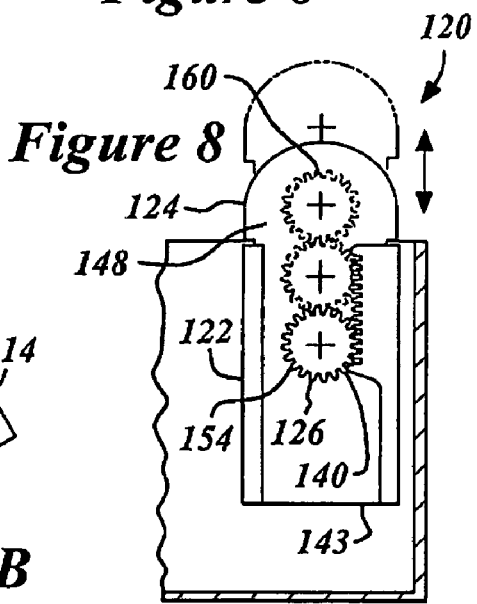

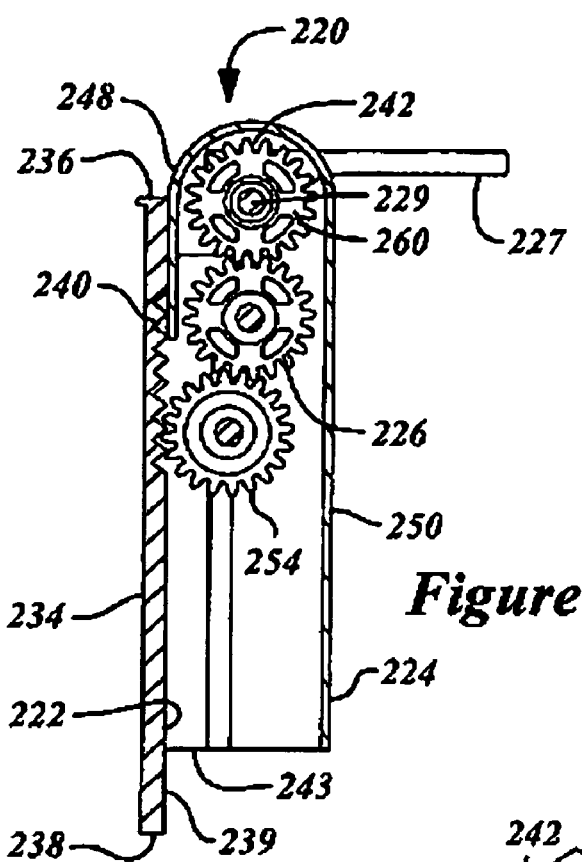
*Figure 10*
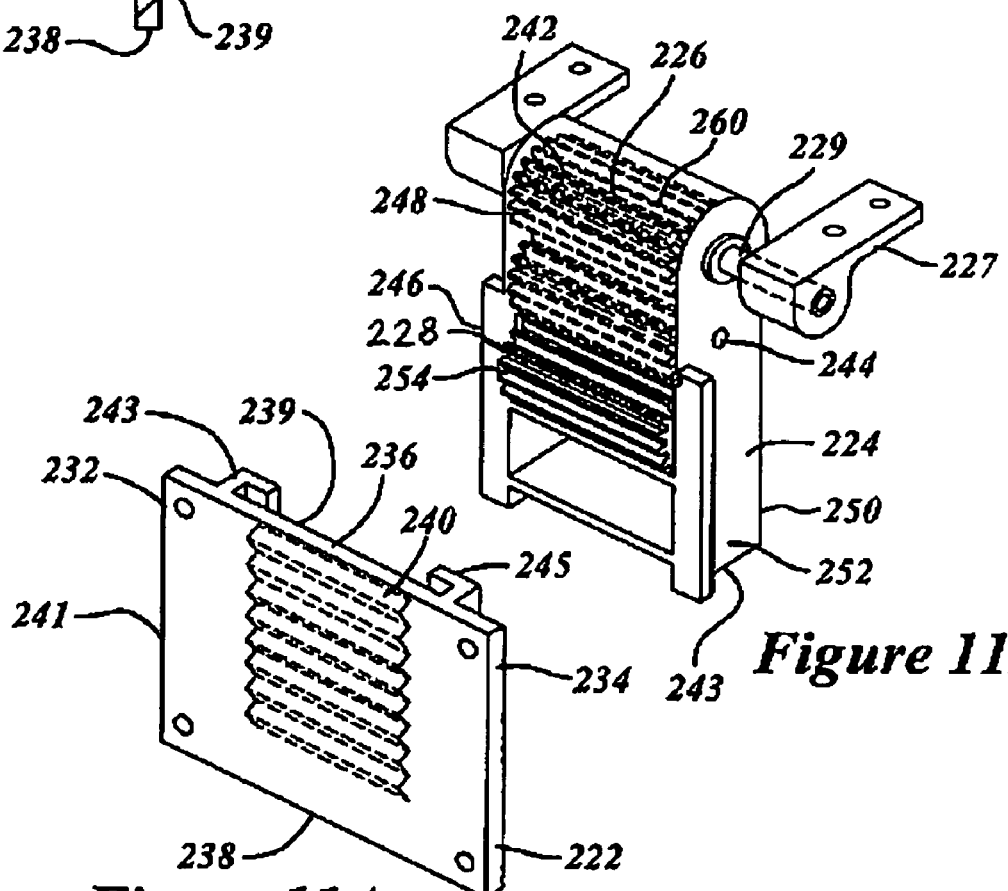
*Figure 11A*
*Figure 11B*

US 7,168,750 B2

RISING HINGE SYSTEM FOR COMPARTMENT LID

TECHNICAL FIELD

The present invention relates to automotive interior trim and more particularly, to a rising hinge system for a center console compartment lid.

BACKGROUND OF THE INVENTION

Compartment lids are incorporated into vehicles for ergonomic reasons and comfort and convenience of both drivers and passengers. Compartment lids may be attached to or integrally formed as part of an interior door panel, a seat assembly, an overhead console, a center console, an instrument panel, a floor system, or any other interior panel.

In current vehicle systems, difficulties often arise in maintaining relationships to adjacent panels while hinging compartment lids. Most vehicle manufacturers resolve this through strategic placement of the lids.

Further, it is a constant goal in automotive design to conceal or minimize appearance of compartment lids while maximizing the volume of compartments.

Thus, there exists a need for an improved compartment lid and associated hinging system.

SUMMARY OF THE INVENTION

The present invention overcomes the above-stated disadvantages. In one embodiment of the present invention, a vehicle storage compartment system for a central console includes a lid and a set of hinge blades rotatably coupled to the lid and springably coupled to the storage compartment. The system also includes a set of tracks, and each of the tracks receives one of the set of hinge blades, such that the set of hinge blades move upwardly and downwardly as a function of opening and closing the lid. This movement allows the lid to flip open 180° and lie flushly against an adjacent object.

In accordance with another embodiment of the present invention, each of the set of hinge blades define limit stop openings and receive fixed limit stoppers therethrough, thereby limiting vertical movement of the set of hinge blades.

The embodiment of the present invention provides several advantages. One such advantage is that it maximizes apace usage by allowing objects to be placed adjoining or adjacent to the compartment while still allowing the compartment lid to open fully unencumbered by the adjoining or adjacent objects.

Another advantage provided by an embodiment of the present invention is that that the lid will lie flat against an adjacent compartment or object, thereby allowing the bottom of the lid to be used as a tray or cup holder.

The present invention itself, together with further objects and attendant advantages, will be best understood by reference to the following detailed description, taken in conjunction with the accompanying drawing.

DESCRIPTION OF THE DRAWINGS

For a more complete understanding of this invention reference should now be had to the embodiments illustrated in greater detail in the accompanying figures and described below by way of examples of the invention wherein:

FIG. 2B is the automotive system of FIG. 1 with the second storage compartment assembly in operation, in accordance with another embodiment of the present invention.

FIG. 3 is a perspective view of a compartment lid system in accordance with another embodiment of the present invention.

FIG. 4A is a component view of the track of the compartment lid system of FIG. 3.

FIG. 4B is a component view of a hinge blade for the compartment lid system of FIG. 3.

FIG. 5 is a side view of the compartment lid system of FIG. 3 in a storage compartment assembly in accordance with another embodiment of the present invention.

FIG. 6 is a side view of a hinge system in accordance with another embodiment of the present invention.

FIG. 7A is a perspective view of a pivoting track for the hinged system of FIG. 6.

FIG. 7B is a perspective view of a hinge blade for the hinged system of FIG. 6.

FIG. 8 is a side view of a hinge system in accordance with another embodiment of the present invention.

FIG. 9A is a track for the hinge system of FIG. 8;

FIG. 9B is a hinge blade for the hinge system of FIG. 8.

FIG. 10 is a side view of a hinge system in accordance with another embodiment of the present invention.

FIG. 11A is a rack plate including a track for the hinge system of FIG. 10.

FIG. 11B is a hinge blade for the hinge system of FIG. 10.

DETAILED DESCRIPTION OF THE PREFERRED EMBODIMENT(S)

While the present invention is described primarily with respect to a compartment lid for a central console of an automotive vehicle, the present invention may be adapted to various compartment lids, as will be understood by one skilled in the art. For example, the present invention may be applied to compartment lids included in a console, a center console, an interior vehicle panel, an interior panel wheel well cover, a door panel, or to other compartment lids known in the art. The present invention may be applied to ground-based vehicles, aeronautical vehicles, watercraft, and other vehicle and non-vehicle applications.

In the following description, various operating parameters and components are described for a number of constructed embodiments. These specific parameters and components are included as examples and are not meant to be limiting.

Figure 1:
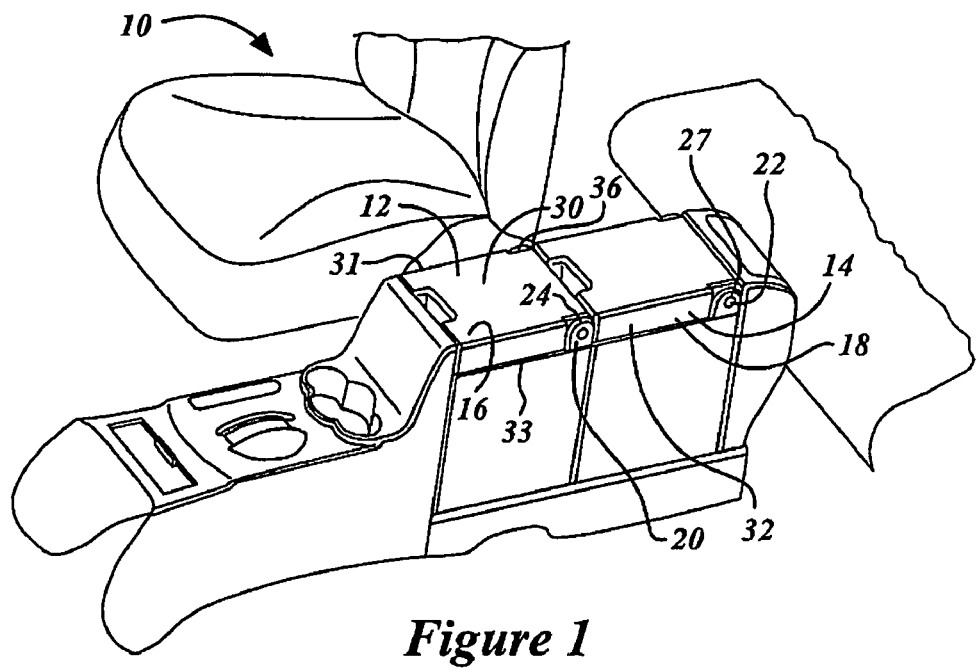
FIG. 1 is a perspective view of an automotive system including two storage compartments in accordance with one embodiment of the present invention.

Referring to FIGS. 1 and 2, an automotive system 10, herein illustrated as a floor central console, is illustrated including two storage compartment assemblies 12, 14 (first storage compartment assembly 12, second storage compartment assembly 14) in accordance with one embodiment of the present invention. Each of the storage compartment assemblies 12, 14 include compartment lid systems 16, 18; and each of the compartment lid systems 16, 18 include a respective hinge system 20, 22. Each hinge system 20, 22 includes a set of hinges 24, 27. Each set of hinges 24, 27 is coupled to a respective lid 30, 32.

As illustrated, when the first lid 30 moves from position A to position B, the first set of hinges 24 moves in an upward direction such that the first lid may lie flushly against the second lid 32. The lid 30 includes a top 31 and a bottom 33, which faces the interior 35 of the compartment 12 when the lid 30 is closed. When the lid 30 is fully open (i.e. open 180°), the bottom 33 faces upwards and may include a cup holder or a tray 37.

Figure 2A:
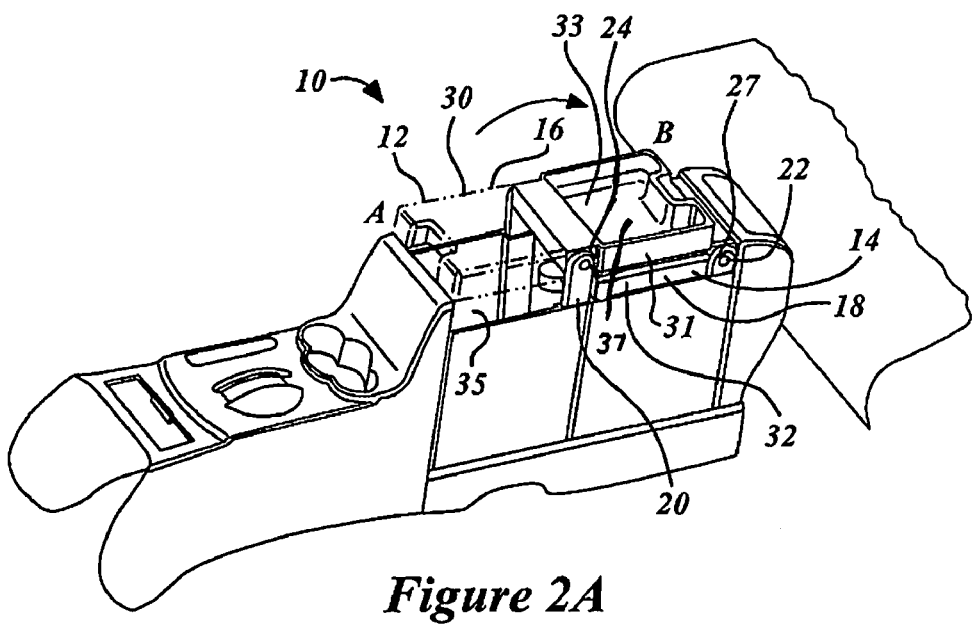
FIG. 2A is a perspective view of the automotive system of FIG. 1 including two storage compartment assemblies, wherein the first of those storage compartment assemblies is illustrated in operation, in accordance with one embodiment of the present invention.

Referring to FIG. 2b, the floor console automotive system 10 of FIG. 2A is illustrated with the second lid 32 moved from position C to position D in accordance with another embodiment of the present invention. Alternately, the second lid 32 may be oriented such that it closes for lying flushly adjacent to the first lid 30.

Referring to FIGS. 2a, 2b, and 3, the compartment lid system 16 is illustrated in accordance with another embodiment of the present invention. The hinge system includes the lid rotatably coupled to a first blade 34 (hinging device) and a second blade 36 (set of blades), such that the lid may rotate 180° or more. Referring to FIGS. 3, 4A, 4B, and 5, the hinge system 20 includes two hinge blades 34, 36, which are the actual components that the lid 30 is coupled to. The blades 34, 36 slide into tracks 38, 40 (set of tracks), which may be coupled to springs 42, 44 (set of springs), which are in turn coupled to a portion 46 of the storage compartment assembly 12.

The track 38 (first track) includes a left side 53, a right side 54, a middle portion 55, an upper portion 56, and a lower portion 57 and is designed such that two guides 48, 50 receive the blade 34. The guides 48, 50 are here embodied as being on opposite sides of the track 38, such that there is no contact between the guides 48, 50. Alternate embodiments of the present invention include a single guide or the two guides 48, 50 contacting each other, or any other variation of the aforementioned guides 48, 50. Further, the track 38 includes a bolt hole 39 defined therein such that a hinge blade extension limit stopper 52 may be coupled thereto.

The blade 34 is generally flat and includes a lower portion 58, an upper portion 60, two side portions 62, 64, a middle portion 65, a front 67, a back 69, and a common edge 71. The embodied blade 34 defines three openings 66, 68, 70 therein.

The first opening 66 is defined in the upper portion 60 such that the lid 30 may be hingeably coupled thereto. The second opening 68 is defined in the lower portion 58 for receiving the spring 42 for coupling to the storage compartment assembly 12. The third opening 70 is defined in the middle portion 65 of the blade 34 and serves as a limit stopper track, such that when the blade 34 moves the limit stopper 52 will have movement restricted to the parameters of the third opening 70. In other words, the third opening 70 or slot allows vertical movement of the hinge blade 34; and the limit stopper 52 or bolt provides an upper travel limit stop.

The spring 42 is coupled to the interior 35 of the compartment 12 and returns the lid 30 to the down position by itself or with the aid of a vehicle operator.

Referring FIGS. 6, 7A, and 7B an alternate embodiment of a rising hinge system 80, in accordance with another embodiment of the present invention, is illustrated. The rising hinge system 80 includes a pivoting track 82, a hinged blade 84, a track spring 86, a hinge blade extension limit stop 88, an angle limit stop 90, and a hinge blade spring 92. All of which is coupled to the console body or interior of a storage compartment 94. In accordance with this embodiment, the pivoting track 82 includes an upper portion 96, a lower portion 98, a left side portion 100 and a right side portion 102.

Each of the side portions 100, 102 define guides such that the hinge blade 84 may be slidably coupled to the pivoting track 82. The lower portion 98 is defined such that a track spring coupler 104 is molded therein, such that the track spring 86 may be coupled thereto and further coupled to the storage compartment interior 94. The lower portion 98 is embodied as semi-circular, such that contact with portions of the storage compartment interior 94 will not result in substantial scuffing of the pivot track 82. The pivot track 82 further comprises a central portion, which in turn defines an opening 109 to which the hinge blade extension limit stop 88 may be coupled.

The angle limit stop 90 includes at least one prong 91 extending therefrom and is coupled to the inside surface of the storage compartment 94. As the hinge blade 84 and pivoting track 82 move in an angulated manner relative to axis 108, the side portion 100 of pivoting track 82 will come in contact with the limit stop. This ensures that that the pivoting track 82 and hinge blade 84 may not move in an angulated manner outside of acceptable parameters.

The track spring 86 couples the pivoting track 82 to the interior of the compartment, thereby allowing the aforementioned angulated movement, such that when a compartment lid is being raised or lowered, the hinge blade may move both vertically along the axis 108 and in an angulated manner relative to axis 108. Further, the hinge blade extension limit stop 88 will prevent movement of the hinge blade 84 outside of acceptable parameters.

The hinge blade 84, as was discussed in previous embodiments of the present invention, defines three openings (upper opening 110, middle opening 112 or hinge blade extension limit stop parameters, and lower opening 114). The upper opening 110 will receive a hinge portion of the compartment lid. The middle opening 112 will allow movement of the hinge plate extension limit stop 88 such that the hinge plate 84 may move in a vertical manner relative to the hinge plate extension limit stop 88. The lower opening is defined such that the hinge plate spring 92 may be coupled thereto such that the hinge blade 84 is springably coupled to the pivoting track 82.

Referring to FIGS. 8, 9A, and 9B, an alternate embodiment of a rising hinge system 120, in accordance with another embodiment of the present invention, is illustrated. The rising hinge system 120 includes a track 122, a blade 124 having a system of gears 126 and pinions 128, at least one of the gears 126 is rotatably or fixedly coupled to the compartment lid.

The track 122 includes a left side portion 132, a right side portion 134, an upper portion 136, and a lower portion 138. The left portion 132 and the right portion 134 define guides, such that the hinge plate 124 may be slidably coupled to the track 122. The right side portion 134 further includes a plurality of gear teeth 140 extending towards the left side portion 132.

The blade 124 includes an upper portion 142, a lower portion 143, a left side 146 and a right side 144, a front 148, an opposing back 150, and a common edge 152.

Coupled to the front 148 is the drive pinion 128 having gear teeth 154, which are designed to be moveably coupled to the plurality of teeth 140. Coupled to the back 150 is a plurality of idler gears 126, here embodied as three, which respond to movement of the drive pinion 128. As the lid is opened, the idler gears 126 are engaged and they in turn engage the pinion, which moves the lid vertically while it climbs the plurality of gear teeth 140.

The top portion 142 is semi-circular and includes resting portions 156, 158 extending therefrom, such that the hinge blade 124 will not recede into the track 122 below the resting portions 156, 158.

The lid of the compartment attaches to the uppermost idle gear 160 such that movement of the lid will result in the hinge blade 124 moving upwards as a function of the reaction thereto of the idle gears 126 and the drive pinion 128 moving along the plurality of teeth 140. The hinge blade 124 moves vertically, such that it moves upwardly as the lid is being opened and downwardly as the lid is being closed.

Referring to FIGS. 10, 11A, and 11B, an alternate embodiment of a rising hinge system 220, in accordance with another embodiment of the present invention, is illustrated. The rising hinge system 220 includes a rack plate 222, a gear housing 224 (hinging device) enclosing a system of gears 226, at least one of the gears 226 is rotatably or fixedly coupled to the compartment lid through a hinge block 227 rotating as a function of a gear controlled splined shaft 229.

The rack plate 222 includes a left side portion 232, a right side portion 234, an upper portion 236, a lower portion 238, a front 239, and an opposing back 241. The front 239 defines guides 243, 245 in an area of the left portion 232 and in an area of the right portion 234, such that the gear housing 224 may be slidably coupled to the rack plate 222. The front 239 further includes a gear track 240 extending between the guides 243, 245.

The gear housing 224 includes an upper portion 242, a lower portion 243, a left side 246 and a right side 244, a front 248, a back 250, and an edge 252.

Partially extending from the front 248 is the drive gear 228 having gear teeth 254, which are designed to moveably couple to the gear track 240. Enclosed in the gear housing 224 is the plurality of idler gears 226, here embodied as two, which respond to movement of the drive gear 228. As the lid opens, the idler gears 226 are engaged; and they in turn engage the drive gear 228, which moves the lid vertically while it climbs the gear track 240.

Extending through the left side 246 and the right side 244 of the top portion 242 of the housing 224 is the splined shaft 229, which is coupled through the uppermost idler gear 260. Mounted on the ends of the splined shaft 229 is a pair of hinge blocks 227, which are thereby coupled to the lid and act as a limit stop therefor.

The lid of the compartment attaches to the uppermost idle gear 260 such that movement of the lid will result in the gear housing 224 moving upwards as a function of the reaction thereto of the idle gears 226 moving vertically along the gear track 240. The gear housing 224 therefore moves upwardly as the lid is being opened and downwardly as the lid is being closed.

In operation, as a vehicle operator opens a compartment lid, a compartment lid system is engaged such that a hinge blade will move either vertically or in an angulated direction relative to a vertical axis and upwardly. The upward movement of the hinge blade is a function of gears or springs or merely force applied by the vehicle operator. When the compartment lid is closed, forces, such as spring forces, gear forces, gravity or force applied by the vehicle operator will pull the hinge blade downward such that as the lid is closing further force is added to such closing.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A hinge system for a vehicle storage compartment having a lid comprising:
   a first track;
   a first hinging device comprising an upper portion, a lower portion, a left side portion, a right side portion, a middle portion, a front, a back, and an edge,
   said upper portion rotatably coupled to the lid,
   said left side portion and said right side portion slidably coupled to said first track whereby said first hinging device rises vertically as a function of opening the lid; and
   a first limit stop system moveably coupled to said first hinging device and limiting vertical movement of said first hinging device with respect to said first track.

2. A system as in claim 1, wherein said first track comprises a left side, a right side, a middle portion, an upper portion, and a lower portion, said left side wrapping around said left portion of said first hinging device and said right side wrapping around said right portion of said first hinging device.

3. A system as in claim 2, wherein said first limit stop system comprises a limit stopper fixedly coupled to said middle portion of said first track, wherein said middle portion of said first hinging device defines an opening, such that said limit stopper extends at least partially through said opening, and said opening limits movement of said limit stopper as said blade raises and lowers.

4. A system as in claim 2 further comprising a track spring coupled to said lower portion of said first track, said track spring adapted to couple to an interior of a vehicle compartment, such that a combination of said first track and said first hinging device are moveably coupled to said interior through said track spring, thereby allowing vertical movement of said first hinging device and pivotal movement of a combination of said first track and said first hinging device.

5. A system as in claim 4 further comprising an angle limit stop coupled to said left side of said first track, said angle limit stop comprising at least one prong extending away from said left side of said first track.

6. A system as in claim 2, wherein said right side of said first track comprises a plurality of gear teeth extending towards said left side of said track.

7. A system as in claim 6, wherein said first limit stop system comprises a drive pinion coupled to said front of said first hinging device said drive pinion moveably coupled to said plurality of gear teeth; and
   at least one idle gear coupled to the lid and moving as a function of movement of said drive pinion.

8. A system as in claim 2, wherein said upper portion of said first hinging device extends outwardly thereby preventing said first hinging device from fully receding into said first track.

9. A system as in claim 1, wherein said upper portion is semicircular.

10. A system as in claim 1 further comprising at least one spring coupled to said lower portion of first hinging device.

11. A system as in claim 1 further comprising at least one idler gear, a drive gear, and a splined shaft, wherein said first hinging device comprises a gear housing containing said at least one idler gear and said drive gear, said idler gear moving as a function of movement of the lid and coupled thereto through said splined shaft, said drive gear moving along said track as a function of movement of said idler gear, wherein said track is integral to a rack plate for mounting said system to a vehicle.

* * * * *